C. M. GROSS.
BUILDER'S LINE HOLDER.
APPLICATION FILED JAN. 29, 1920.
1,344,224. Patented June 22, 1920.
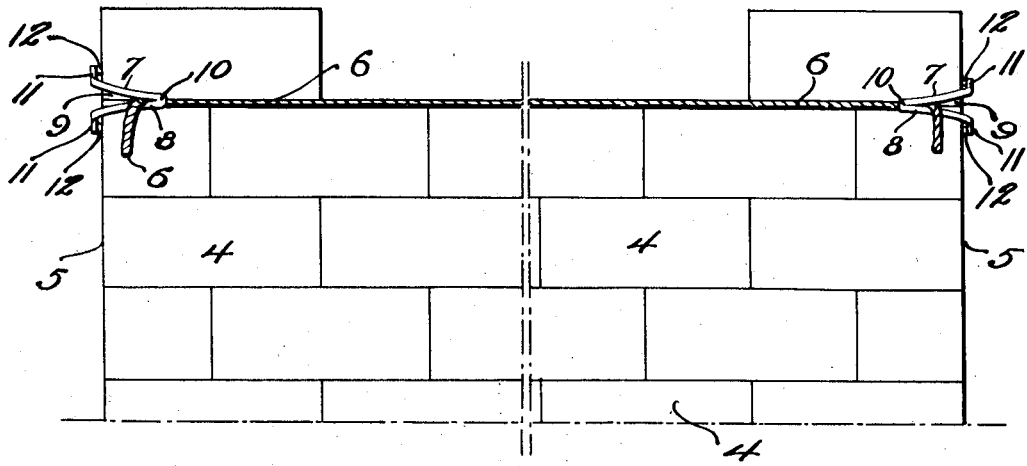
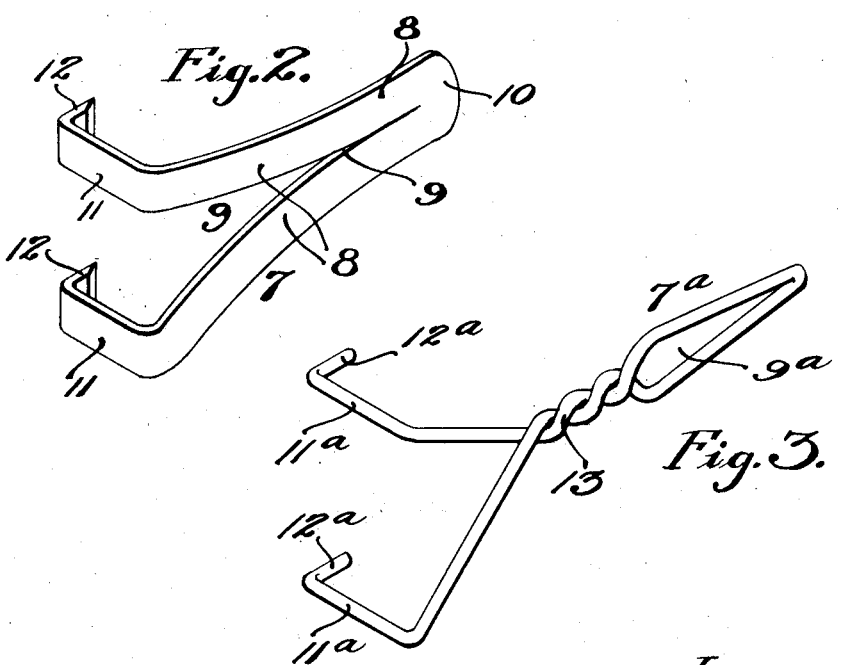
Witnesses
Geo. A. Gross
Augustus B. Coppes
Inventor
Charles M. Gross
By Joshua R. H. Potts
his Attorney

UNITED STATES PATENT OFFICE.

CHARLES M. GROSS, OF MOUNT UNION, PENNSYLVANIA.

BUILDER'S-LINE HOLDER.

1,344,224.  Specification of Letters Patent.  Patented June 22, 1920.

Application filed January 29, 1920. Serial No. 354,995.

*To all whom it may concern:*

Be it known that I, CHARLES M. GROSS, a citizen of the United States, residing at Mount Union, in the county of Huntingdon and State of Pennsylvania, have invented certain new and useful Improvemnts in Builders'-Line Holders, of which the following is a specification.

One object of my invention is to provide an improved holder for masons' and builders' lines by the use of which said lines can be quickly and securely placed and held in position to serve as a gage.

Another object is to make my improved holder of a simple and durable construction and so that it can be cheaply made.

These objects, and other advantageous ends which will be described hereinafter, I attain in the following manner, reference being had to the accompanying drawings in which Figure 1 is an elevational view showing my invention applied to a builder's line and illustrating how it can be held in engagement with a partially completed wall to permit the line to serve as a gage, Fig. 2 is a perspective view of one of my improved holders of a type such as shown in Fig. 1, and Fig. 3 is a perspective view showing a modified form of my improved holder.

Referring to Figs. 1 and 2, 4 represents a wall or other structure having ends 5. A builder's line 6 has two of my improved holders 7 thereon. Each of the holders has an extension 8 adapted to project substantially in the direction of the length of the line 6. This extension 8 has a wedge shape opening 9 tapering toward the closed end 10. The extension 8 has arms 11 extending at an angle to the plane thereof and the ends of the arms are bent to provide hooks which extend for a short distance parallel to the extension 8 and in the direction in which the opening 9 tapers.

The opening 9 tapers to a width far less than the thickness of the line 6 so that when the end portion of the line 6 is inserted within the opening 8 of the holder and pulled into the narrow end thereof the line will be compressed and firmly held within said opening.

It is an easy matter however to pull the line into the wide part of the opening and considering that two of the holders are thus connected to the line and positioned so that the hooks 12 engage the opposite sides 5 of the wall 4, one end portion of the line 6, after having been drawn into the wide portion of the opening 9, can be pulled so as to stretch the line 6 and when the line is thus stretched said latter end portion can be again drawn into the narrow part of the opening 9 and the elasticity of the line 6, thus attenuated, will tend to pull both holders toward each other and thereby cause the hooks 12 to frictionally engage the sides of the wall and hold the line 6 in position.

While I preferably provide two holders for the line, in order to permit adjustment from either end of the line, it will be noted that if desired only one holder need be used at one end of the line, in the event of which the opposite end of the line can have any form of hook tied or otherwise secured thereto which will engage one of the sides 5 of the wall.

The form of holder shown in Figs. 1 and 2 can be made by stamping it out of sheet metal or it can be made of strip metal and bent within its length at 10.

In Fig. 3 I have shown a modified form of my invention which can be made from a single length of wire $7^a$ in which the wedge opening $9^a$ is provided in the looped extension $8^a$; the wire being preferably twisted together at 13 between the opening $9^a$ and the arms $11^a$. The arms $11^a$ are bent at their ends to provide hooks $12^a$ in a manner similar to the hooks 12.

It is quite an easy matter to secure a line with my improved holders. One of the holders can be fastened to one end of the line and by placing this holder against one side 5 of the wall, the workman can walk, pulling the line taut, until he reaches the opposite side 5 of the wall. He can then place the other holder with its hooks against said latter side of the wall and by pulling the line into the tapered opening as above described can quickly place the line in position. When once thus placed the line and holders can be easily shifted vertically without entire detachment from the wall.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A line holder of the character described including an extension provided with a tapered opening, said extension having a portion extending at such angle to the plane thereof as to be capable of engaging the side of a wall or the like, said opening tapering in a direction away from said portion; substantially as described.

2. A line holder of the character described including an extension provided with a tapered opening, said extension having arms extending at an angle to the plane thereof for engaging the side of a wall, said arms having hooks extending substantially in the direction of the taper of said opening; substantially as described.

3. A line holder of the character described including an extension provided with a tapered opening, said extension having arms extending at an angle to the plane thereof for engaging the side of a wall, said arms being spaced apart; substantially as described.

In testimony whereof I have signed my name to this specification in the presence of two subscribing witnesses.

CHARLES M. GROSS.

Witnesses:
ROBERT Z. BASSETT,
JOHN A. GROSS.